United States Patent
Aznavorian et al.

(10) Patent No.: US 8,694,382 B2
(45) Date of Patent: Apr. 8, 2014

(54) SYSTEM AND METHOD FOR AUTOMATIC GUIDANCE CONTROL OF A VEHICLE

(75) Inventors: Todd S. Aznavorian, Naperville, IL (US); William L. Schubert, Downers Grove, IL (US)

(73) Assignee: CNH America LLC, New Holland, PA (US)

( * ) Notice: Subject to any disclaimer, the term of this patent is extended or adjusted under 35 U.S.C. 154(b) by 177 days.

(21) Appl. No.: 13/217,758

(22) Filed: Aug. 25, 2011

(65) Prior Publication Data

US 2012/0215395 A1 Aug. 23, 2012

Related U.S. Application Data

(60) Provisional application No. 61/444,361, filed on Feb. 18, 2011.

(51) Int. Cl.
*G05D 1/00* (2006.01)

(52) U.S. Cl.
USPC ........ 705/25; 701/1; 701/23; 701/25; 701/26; 701/41; 701/50; 340/521; 340/963; 62/129; 62/227; 713/201; 250/307

(58) Field of Classification Search
USPC ........ 701/1, 23, 25, 26, 41, 50; 340/521, 963; 713/201; 62/129, 227; 250/307
See application file for complete search history.

(56) References Cited

U.S. PATENT DOCUMENTS

| | | | |
|---|---|---|---|
| 4,664,052 A | 5/1987 | Burns et al. | |
| 4,996,468 A | 2/1991 | Field et al. | |
| 5,249,126 A | 9/1993 | Hattori | |
| 5,313,389 A | 5/1994 | Yasui | |
| 5,373,911 A | 12/1994 | Yasui | |
| 5,925,080 A | 7/1999 | Shimbara et al. | |
| 5,956,250 A | 9/1999 | Gudat et al. | |
| 6,345,217 B1 | 2/2002 | Zeitler et al. | |
| 6,442,463 B1 | 8/2002 | Qiu et al. | |
| 7,225,060 B2 | 5/2007 | O'Connor et al. | |
| 2002/0087245 A1* | 7/2002 | Rossow et al. | 701/50 |
| 2003/0083796 A1* | 5/2003 | Denton | 701/50 |

(Continued)

FOREIGN PATENT DOCUMENTS

WO WO2005119290 A1 12/2005

OTHER PUBLICATIONS

Gierusz et al: "Maneuvering control and trajectory tracking of very large crude carrier", Ocean Engineering, Pergamon, Amsterdam, NL, vol. 34, No. 7, Apr. 13, 2007, pp. 932-945, XP022028201, ISSN: 0029-8018, DOI: 10.1016/J.OCEANENG.2006.06.003 pp. 938,940—p. 942; figures 12,14,17.

*Primary Examiner* — Muhammad Shafi
*Assistant Examiner* — Sanjeev Malhotra
(74) *Attorney, Agent, or Firm* — Patrick M. Sheldrake (57) ABSTRACT

A system and method is provided for adaptive control of at least one parameter of an auto guidance control algorithm for a vehicle. The parameters may be varied according to a previously established look up table, or automatically adapted through the use of control logic, such as a "fuzzy logic" algorithm. The control parameters that can be adaptively controlled include steered wheel turn rate, proportional valve current gain, line acquisition rate and/or auto guidance control valve current limits. The control algorithm responds to the vehicle's operating parameters such as vehicle speed, tracking error, predicted heading, and hydraulic oil temperature to make adjustments to the auto guidance control parameters.

8 Claims, 4 Drawing Sheets

(56) References Cited

U.S. PATENT DOCUMENTS

| | | | |
|---|---|---|---|
| 2003/0115895 A1* | 6/2003 | Beaverson et al. | 62/227 |
| 2003/0149518 A1* | 8/2003 | Brandt et al. | 701/50 |
| 2004/0250124 A1* | 12/2004 | Chesla et al. | 713/201 |
| 2005/0146428 A1* | 7/2005 | Mahoney et al. | 340/521 |
| 2005/0288834 A1* | 12/2005 | Heiniger et al. | 701/23 |
| 2006/0059926 A1* | 3/2006 | McCormick et al. | 62/129 |
| 2006/0282205 A1* | 12/2006 | Lange | 701/50 |
| 2008/0195282 A1 | 8/2008 | Norris et al. | |
| 2008/0215203 A1* | 9/2008 | Dix et al. | 701/26 |
| 2008/0249692 A1* | 10/2008 | Dix | 701/50 |
| 2008/0269956 A1* | 10/2008 | Dix et al. | 701/1 |
| 2008/0269988 A1* | 10/2008 | Feller et al. | 701/41 |
| 2008/0275609 A1 | 11/2008 | Boydell | |
| 2008/0294309 A1 | 11/2008 | Kaprielian et al. | |
| 2009/0099730 A1 | 4/2009 | McClure et al. | |
| 2009/0276111 A1 | 11/2009 | Wang et al. | |
| 2010/0318253 A1* | 12/2010 | Brubaker et al. | 701/25 |
| 2011/0196565 A1* | 8/2011 | Collins et al. | 701/26 |
| 2011/0267206 A1* | 11/2011 | Reynolds et al. | 340/963 |
| 2012/0145894 A1* | 6/2012 | Wu et al. | 250/307 |

\* cited by examiner

SYSTEM AND METHOD FOR AUTOMATIC GUIDANCE CONTROL OF A VEHICLE

CROSS-REFERENCE TO RELATED APPLICATIONS

This application claims the benefit of U.S. Provisional Application No. 61/444,361, entitled "SYSTEM AND METHOD FOR AUTOMATIC GUIDANCE CONTROL OF A VEHICLE," filed Feb. 18, 2011, which application is hereby incorporated by reference in its entirety.

BACKGROUND

The application generally relates to automated methods for controlling a path of a vehicle. The application relates more specifically to automatically controlling a steering system of an agricultural or construction vehicle along a predetermined swath path.

Methods for automatically controlling or steering an agricultural or construction vehicle via global positioning system (GPS) or local position detection systems are known. Such vehicles may be guided along a predetermined path using position sensors that communicate the vehicle position relative to the desired path to an automatic guidance controller.

Various parameters in an auto-guidance (AG) control algorithm may be adjustable by the operator to fine-tune the performance of the AG system for such aspects as the rate at which the vehicle will turn the steering system to reduce the amount of time and length of travel before the vehicle may acquire the desired path, or to reduce the margin of error with respect to the desired path. The auto-guidance parameters that may be applied in the AG control algorithm may also affect how accurately the vehicle follows the path. The path can vary from a straight line, to a curved pattern, to a circular pattern, etc. A curved path can have varying degrees of turn from a very gradual turn to a very sharp turn, subject to the limits of the vehicle's ability to make the prescribed turn, i.e., the vehicle's turning radius. The minimum turn radius that a vehicle can negotiate may in some instances be set by the vehicle operator, or in other instances, the limit may be automatically calculated by the AG control algorithm software based on the vehicle type entered into the software.

A single value for the operator adjustable AG parameters may not provide a desired performance level or accuracy for all of the variations in operating conditions that the vehicle is likely to encounter. It is difficult for an operator to constantly change the AG parameters in response to changing field conditions. For example, one value of the parameter may be adequate for a straighter portion of a curved path, yet unacceptable for a sharper curved portion of the path, as the sharper curved portion introduces errors in tracking the path. Further, some AG parameters that can be adjusted require specialized equipment and personnel to access the AG algorithm in order to properly adjust or tune the AG parameter. The operator is not able to readily change these parameters to optimize AG system performance during operation of the vehicle.

Therefore, what is needed is a system and method to adaptively adjust, either automatically or manually, one or more control parameters of an AG control algorithm to more accurately follow a predetermined path or swath.

SUMMARY

One embodiment of the present application relates to a system and method of controlling a vehicle by adaptive control of at least one parameter in an Auto Guidance (AG) control algorithm. The AG control parameters which may be adaptively controlled can include: steered wheel turn rate; proportional valve current gain; line acquisition rate; or auto guidance control valve current limits. Each of the AG control parameters can be generally associated with the steering operation for the vehicle, but each parameter can and does have a distinct and separate effect on the rate of steering correction. For example, the steered wheel turn rate may be varied based on vehicle travel speed, sharpness of swath turn or the width of the vehicle or attached implement. Proportional valve current gain may vary depending on oil temperature and the control valve current limits may vary based on engine speed (pump flow rate), oil temperature and/or steering cylinder pressure. The AG control parameters may be varied according to a previously established look up table, or may be automatically controlled by control logic such as, but not limited to, a "fuzzy logic" algorithm.

The adaptive control algorithm can respond to vehicle operating parameters in determining how the AG parameter(s) may be modified to optimize Auto Guidance performance. For example, as vehicle speed increases or decreases, the AG parameter value relating to steered wheel turn rate can be modified to provide improved swath acquisition or swath following. Further, when the magnitude of error in following the swath path or in acquiring the new swath changes, the corresponding AG parameter can be changed to provide faster/better swath acquisition/following for large errors and then gradually adjusted as the vehicle nears the desired path and the error is minimized. A "look ahead" capability for the path heading can determine how sharp an oncoming curve in the path may be and adjust the necessary AG parameters to optimize the performance in maintaining the following of the path. Another AG adaptive control parameter, such as proportional valve current gain, can be adjusted for hydraulic oil temperature so that AG system functionally remains consistent with changes in hydraulic oil temperature. In one embodiment, oil temperatures ranging from 0 degrees Fahrenheit (° F.) to 200° F. can be accommodated. Other operating conditions and situations of the vehicle that may affect performance and may require AG parameter adjustment can include, e.g., vehicle dynamics, side hill operation, implement side draft, dozer/grader blade offset load, change in vehicle mass (e.g., the grain tank mass changes during harvesting as the tank fills, or a product tank mass changes as it empties during spraying operations), AG hydraulic system oil temperature, or vehicle travel speed.

One embodiment of the present application is directed to a method for automatically guiding a vehicle. The method includes engaging an automatic guidance control system to steer a vehicle along a predetermined swath, determining a swath path configuration of the predetermined swath to be subsequently travelled by the vehicle, determining a cross track error for the vehicle relative to the predetermined swath and determining a rate of change of the cross track error. The method also includes calculating a control parameter with the automatic guidance control system in response to the determined swath path configuration, the determined cross track error and the determined rate of change of the cross track error, and generating a control signal to steer the vehicle based on the calculated control parameter. The method further includes determining an operating condition for the vehicle, calculating a response limit for the calculated control parameter in response to the determined operating condition, adjusting the generated control signal by the calculated response limit and applying the adjusted control signal to the vehicle to steer the vehicle along the predetermined swath.

Another embodiment of the present application is directed to a method for automatically guiding a vehicle. The method includes engaging an automatic guidance control system to steer a vehicle to acquire a predetermined swath, measuring a speed of the vehicle, determining a heading difference for the vehicle relative to a heading of the predetermined swath, determining a rate of change of the heading difference, determining a cross track error for the vehicle relative to the predetermined swath and determining a rate of change of the cross track error. The method also includes calculating a control parameter with the automatic guidance control system in response to the measured vehicle speed, the determined heading difference, the determined rate of change of the heading difference, the determined cross track error and the determined rate of change of the cross track error and generating a control signal to steer the vehicle based on the calculated control parameter. The method further includes determining an operating condition for the vehicle, calculating a response limit for the calculated control parameter in response to the determined operating condition, adjusting the generated control signal by the calculated response limit and applying the adjusted control signal to the vehicle to steer the vehicle to acquire the predetermined swath.

A further embodiment of the present application is directed to an automatic guidance system for a vehicle. The automatic guidance system includes a global positioning system device to determine a position of the vehicle and an input device. The input device is operational to enable an operator to enter information. The system also includes a first controller with a microprocessor to execute a computer program to calculate a control signal for the vehicle used to steer the vehicle in relation to a predetermined swath based a control parameter and a second controller with a microprocessor to execute a computer program to generate an adjustment for the calculated control signal in response to a vehicle operating parameter.

One advantage of the present application is the ability to adaptively control an agricultural vehicle such as a tractor or combine, in order to more closely follow a predetermined swath path.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

Figure 1:
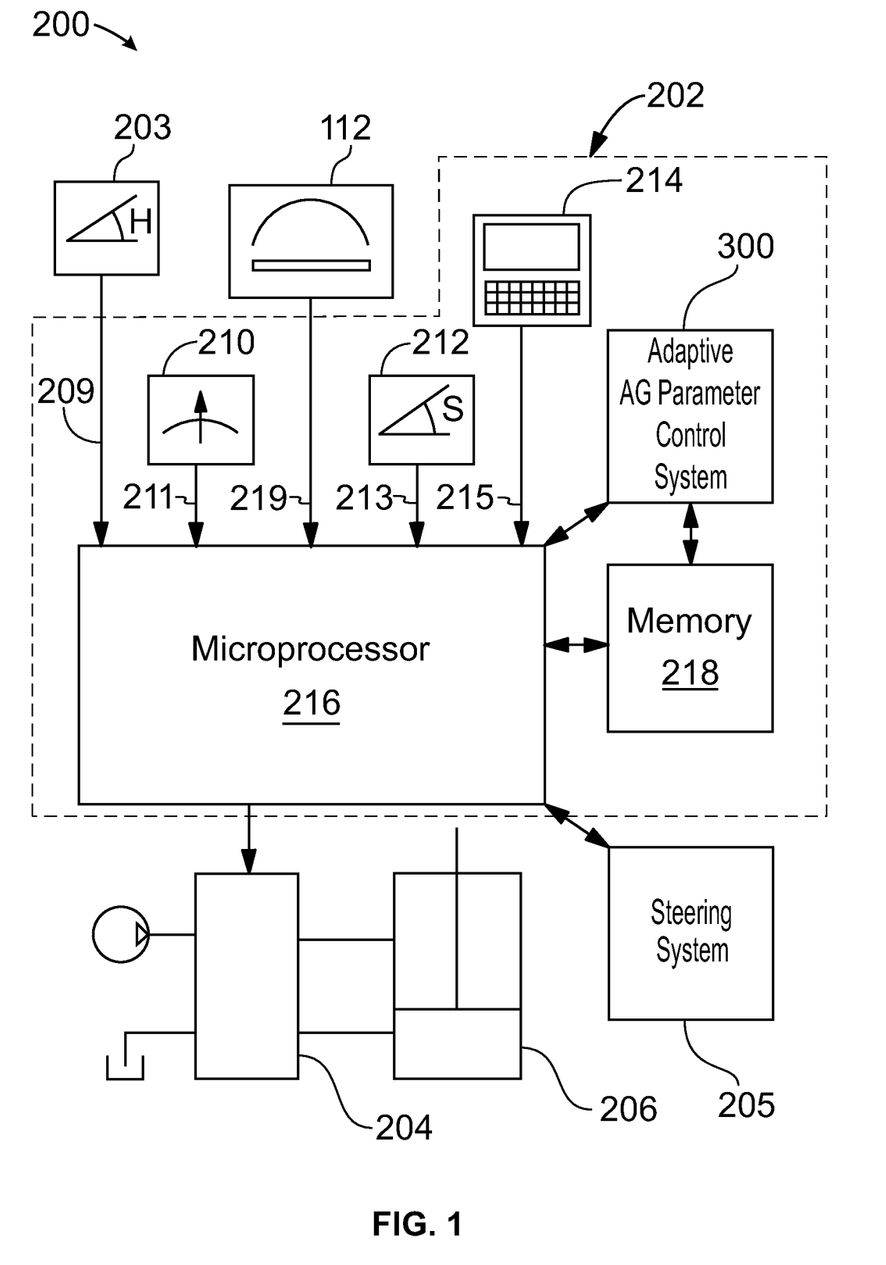
FIG. 1 shows schematically an exemplary embodiment of a vehicle guidance system.

FIG. 1 shows an embodiment of an automatic guidance system. The automatic guidance system 200 can be located on or in a corresponding vehicle and can simplify the task of driving the vehicle along a predetermined swath or path. The operator can select the appropriate or desired predetermined swath or path for the vehicle from stored or recorded swaths or paths in the automatic guidance system 200. In another embodiment, the predetermined swath or path for the vehicle can be determined by the automatic guidance system 200 based on a master swath and the satisfaction of several conditions.

The automatic guidance system 200 can include an electronic control system or controller 202, a GPS receiver 112, a hitch angle sensor 203 (may be used with tractor and connected implement combinations), an implement or vehicle steering system 205 (including both passive steering systems and active steering systems), steering valves 204 and a steering actuator 206. The electronic control system 202 can be communicatively connected to the steering valves 204, the GPS receiver 112, the hitch angle sensor 203 and the implement or vehicle steering system 205. The steering valves 204 can be electrically controlled proportional or directional control valves that are hydraulically connected to the steering actuator 206. The steering actuator 206 can be coupled to and steer steerable wheels on the vehicle, changing their steering angle. In another embodiment, an electrical actuator and related components can be used in place of hydraulically operated steering actuator 206 and valves 204. The electronic control system 202 can continually calculate the auto-guidance (AG) control parameter(s) required to guide the vehicle on the predetermined swath using input parameters such as the vehicle's cross track error, i.e., the distance between the vehicle's position and the predetermined swath, the rate of change of the cross track error, the hydraulic oil temperature, the engine speed of the vehicle, the travel speed of the vehicle, the minimum turning radius of the vehicle, the vehicle's heading, the rate of change of the vehicle's heading and/or the rate of change of curvature of the swath. The electronic control system 202 can then send the calculated AG parameter to the appropriate component to change the vehicle heading, i.e., steer the vehicle. In one embodiment, the electronic control system 202 can send heading information via a control signal to the steering valves 204 to move the steering actuator 206 and cause the steerable wheels to pivot. The control functions, control algorithms or control system provided by the automatic guidance system 200 can be provided by software instructions executed by the microprocessor 216 or other microprocessors incorporated into the electronic control system 202.

The electronic control system or controller 202 can include a vehicle yaw rate sensor 210, a vehicle steering angle sensor 212, an operator input device 214, one or more microprocessors 216, and one or more digital memory circuits or memory devices 218. The yaw rate sensor 210, steering angle sensor 212, operator input device 214 and digital memory 218 are communicatively coupled to the microprocessor 216. The microprocessor 216 is communicatively coupled to the steering valves 204.

The vehicle yaw rate sensor 210 provides or sends a continual yaw rate signal 211 to the microprocessor 216, telling the microprocessor the rate at which the vehicle is changing its heading. The yaw rate sensor 210 may be a laser gyroscope or other rate gyroscope. Alternatively, the vehicle yaw rate sensor 210 may be a microprocessor circuit programmed to calculate the yaw rate from incoming signals or estimated or calculated values. The hitch angle sensor 203 can transmit a hitch angle signal 209 to the microprocessor 216. The implement or vehicle steering system 205 can transmit a input signal to the microprocessor 216.

The vehicle steering angle sensor 212 sends or provides a continual steering angle signal 213 to the microprocessor

216. The steering angle signal 213 tells the microprocessor 216 the current angle of the steerable wheels. The steering angle sensor 212 may be an encoder mounted on the vehicle, or may be a microprocessor circuit programmed to calculate steering angle based upon incoming signals and values stored in the digital memory 218. Alternatively, the steering angle sensor may include a Hall effect device, potentiometer, variable resistor, linear position transducer, or any other sensor in or on the steering actuator, the wheel, the wheel hub, or steering joint that senses wheel steering or relative movement or position of the wheel with respect to another part of the vehicle, such as wheel rotation about a steering kingpin, or alternatively senses the displacement or movement of the steering actuator or other linkage coupled thereto. If the vehicle is an articulated vehicle, the steering angle sensor 212 can be positioned to detect the angle between the two or more vehicle frames or subframes that move or steer with respect to each other in order to turn the vehicle.

The operator input device or user interface 214 can be configured to receive information from the operator and to transmit the information to the microprocessor 216. Data entered by the operator on the input device 214 can be stored in the digital memory 218 by the microprocessor 216. The operator input device 214 can be mounted inside the operator compartment of the vehicle, to be easily accessible to the operator. The operator input device 214 can include a display and a keyboard. The microprocessor 216 can receive process variables from the keyboard or other sensors, and can display the current status of the vehicle (location, direction, etc.) on the display.

The digital memory 218 stores microprocessor instructions and data. The instructions configure the microprocessor 216 to perform guidance functions. The memory also stores process data calculated or estimated by the microprocessor 216 and/or entered by the operator using the operator input device 214.

The GPS receiver 112 continually receives information about the absolute position of the vehicle and forwards a vehicle position signal 219 to the microprocessor 216 that indicates this absolute position. The GPS receiver 112 can be part of a satellite navigation system mounted on the outside of the vehicle, with a clear line of sight to the satellites. Alternatively, the GPS receiver 112 may include an antenna mounted outside the vehicle, while the receiver is mounted inside the vehicle. Alternatives or additions to a GPS receiver can include differential global positioning systems (DGPS), land-based position receivers or dual-frequency real time kinematics (RTK) receivers using inertial navigation system (INS) sensors that provide more accurate position location of the vehicle. In an exemplary embodiment, the DGPS signals can be received via cellular or telematic systems.

An adaptive AG parameter control system or controller 300 can be used to make adjustments to the AG parameters calculated by the electronic control system or controller 202. The adaptive AG parameter control system 300 can receive information on the vehicle type, the swath type, the level of adaptation required, the vehicle's cross track error, i.e., the distance between the vehicle's position and the predetermined swath, the rate of change of the cross track error, the hydraulic oil temperature, the engine speed of the vehicle, the travel speed of the vehicle, the minimum turning radius of the vehicle, the vehicle's heading and/or the rate of change of the vehicle's heading. The information provided to the adaptive AG parameter control system 300 can be from the microprocessor 216 or directly from the corresponding components of the automatic guidance system 200. Once the adaptive AG parameter control system 300 receives the appropriate information, the adaptive AG parameter control system 300 can determine appropriate adjustments to the AG parameters in order to adjust the vehicle heading to more accurately follow a predetermined swath. The control functions, control algorithms or control system provided by the adaptive AG parameter control system 300 can be provided by software instructions executed by the microprocessor 216 or by software instructions executed by a microprocessor dedicated to the adaptive AG parameter control system 300.

Figure 2:
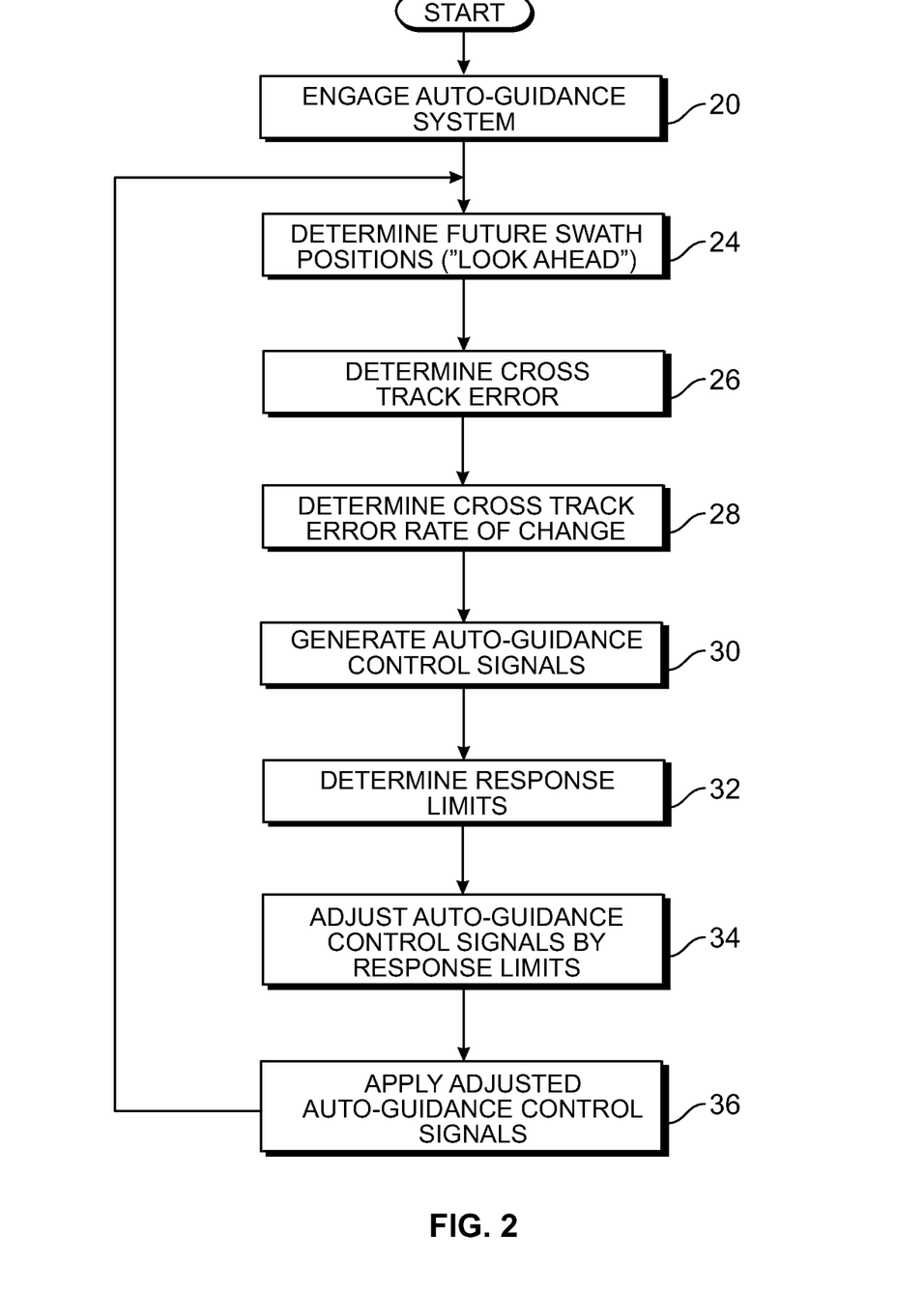
FIG. 2 shows an exemplary embodiment of a flow chart for a control program to provide adaptive auto-guidance parameter control while following a swath.

FIG. 2 shows an embodiment of a process for adaptively controlling an AG parameter to maintain the vehicle along a predetermined swath or path, i.e., swath following. The process begins by engaging the automatic guidance control system, i.e., the operator initiates auto-guidance for the vehicle (step 20). Once the automatic guidance control system is engaged, the automatic guidance control system can retrieve information on the vehicle type and the swath type either from the memory device 218 and/or from the operator input device or user interface 214. In an exemplary embodiment, the information on the swath type can include information on the master swath and/or the predetermined swath for the vehicle.

The adaptive AG parameter control system 300 can use fuzzy logic or look up table(s) to provide further adjustments to the control signals provided or generated by the automatic guidance control system based on how the vehicle's operating parameters are varying. In one exemplary embodiment, the adaptive AG parameter control system 300 may permit the operator to select from different membership functions (when using fuzzy logic controls) or from different look up tables to select a desired level of adjustments.

The automatic guidance control system can then determine where the vehicle is headed on the predetermined swath (step 24), i.e., the automatic guidance control system predicts or "looks ahead" at future vehicle positions. In other words, is the upcoming swath or path for the vehicle straight, curved or sharply curved. To "look ahead," the predetermined or recorded swath or path is automatically replicated by the controller and projected a distance, e.g., 2 kilometers, forward and rearward of the vehicle's current position. Depending on the swath type, e.g., a field swath, the projection can be limited to the boundaries of the field. In addition, the vehicle travel speed can be measured or determined for use by the automatic guidance control system. Next, the cross track error for the vehicle, i.e., the distance between the actual position of the vehicle and the desired position of the vehicle on the predetermined swath is measured and determined (step 26) and the corresponding rate of change of the cross track error is measured or determined (step 28). The measured or determined cross track error can be saved in the memory device 218 for use in determining the rate of change of the cross track error. In addition, the hydraulic oil temperature for the steering actuator 206 can be measured or determined and/or the engine speed for the vehicle can be measured or determined. If not previously provided in the information on vehicle type and swath type, the minimum turn radius for the vehicle and the swath rate of curvature from the predetermined or recorded swath or path can be retrieved.

The automatic guidance control system can calculate control signals based on corresponding AG parameters (step 30) determined from one or more of the vehicle travel speed, the cross track error, the rate of change of the cross track error, the hydraulic oil temperature, the engine speed, the minimum turn radius for the vehicle, the swath rate of curvature or any other suitable vehicle or vehicle related variable or parameter. In one embodiment, the control signals can be pulse width modulation (PWM) control signals to control the current provided to the steering valves 204 to adjust the position of the valves 204 and thereby adjust the amount of hydraulic fluid provided to the steering actuator 206.

Figure 3:
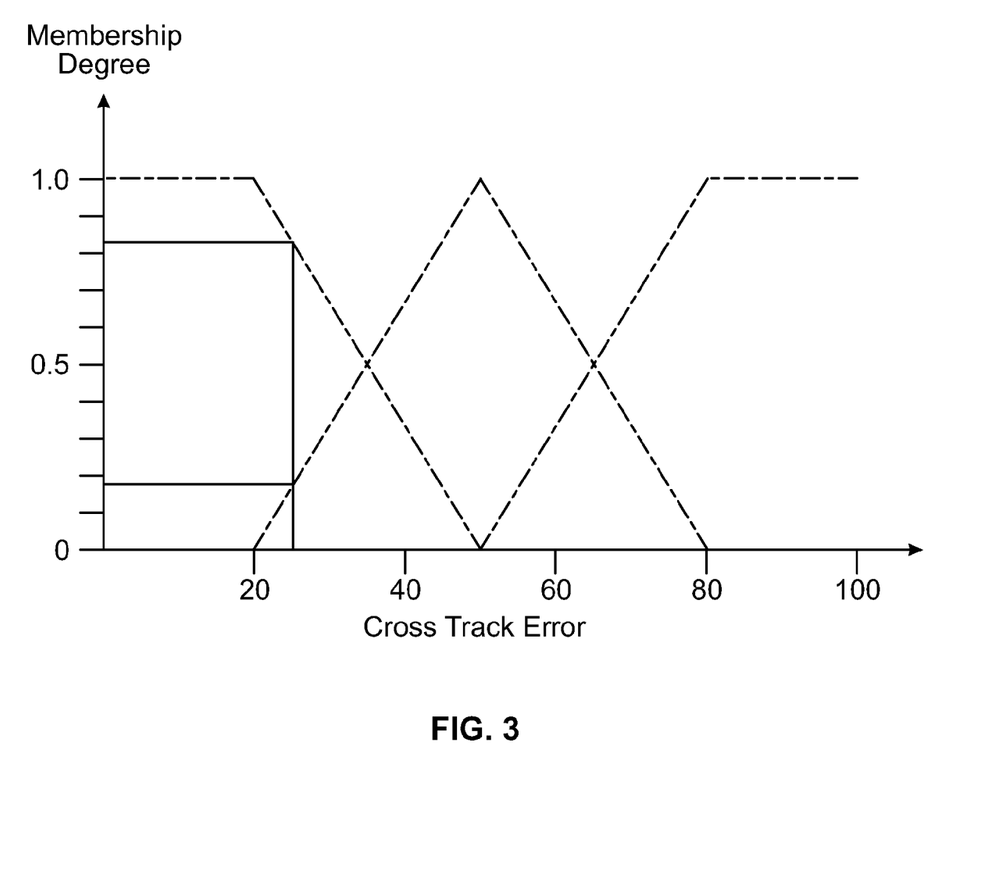
FIG. 3 shows an exemplary membership function based on cross track error.

The adaptive AG parameter control system 300 takes the calculated or generated AG control signals and determines response limits or adjustments for the generated control signals and/or corresponding AG parameters based on changes in the vehicle's operating parameters (step 32). For example, if the cross track error was very high, the rate of turn or steered wheel turn rate would be increased and then decreased as the cross track error was reduced. In another example, if the vehicle travel speed was very high, the rate of turn or steered wheel turn rate may be decreased and then again increased as travel speed was reduced. In one embodiment, the calculation of the response limits or adjustments start by using fuzzy logic membership functions to which the corresponding measured or determined vehicle operating parameters or conditions, e.g., cross track error, cross track error rate of change, hydraulic oil temperature, vehicle travel speed, engine speed (hydraulic flow rate) and/or any other suitable parameter, are applied. FIG. 3 shows an exemplary embodiment of a membership function for the cross track error. The corresponding determined membership values or degrees of membership are then used by a fuzzy logic algorithm or fuzzy logic rules to determine the corresponding response limits.

The determined response limits are then used to adjust the control signals determined by the automatic guidance control system (step 34) and the adjusted control signals are then applied to the corresponding components to control the steering of the vehicle (step 36). The process then returns to determine the vehicle speed and determine where the vehicle is headed on the predetermined swath. The process can be continually repeated for as long as the vehicle is following the predetermined path or until the operator disengages the automatic guidance control system.

In one exemplary embodiment, other vehicle parameters, such as vehicle dynamics, side hill operation, implement side draft, dozer/grader blade offset load, and/or change in vehicle mass (e.g., a grain tank filling during harvesting or a product tank emptying during spraying), can be used to determine the adjustments to the response limits. These other vehicle parameters can have an effect on how the vehicle responds to automatic guidance steering maneuvers and thus, some automatic guidance parameters such as rate of turn may need to be modified. For example, the difference in weight/mass between a full grain tank or sprayer tank and an empty tank may require a modification of the turning rate to keep the vehicle stable. Implement side draft may make it necessary to have a different steer rate to the left versus the steer rate to the right.

Figure 4:
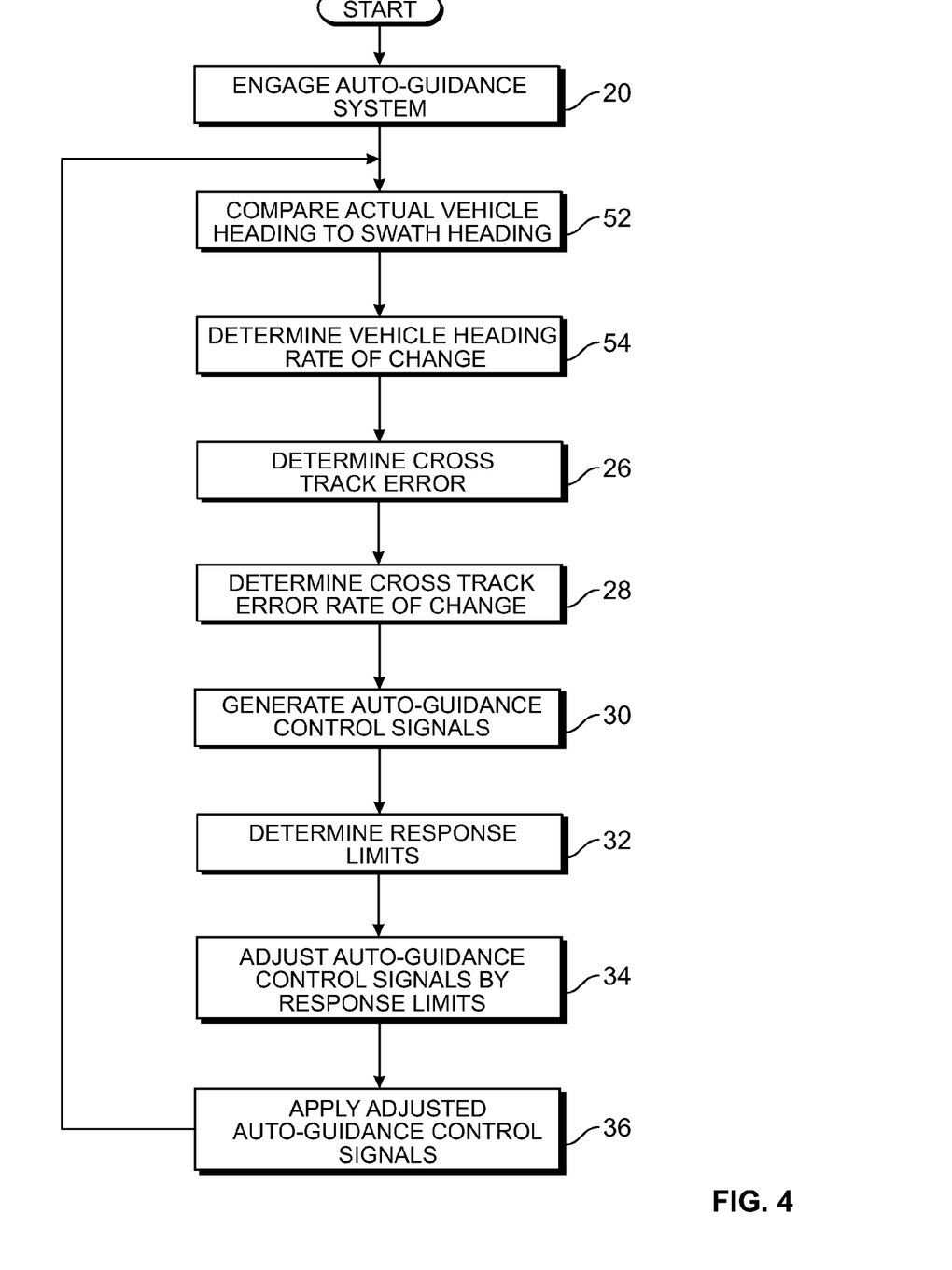
FIG. 4 shows an exemplary embodiment of a flow chart for a control program to provide adaptive auto-guidance parameter control while acquiring a swath.

FIG. 4 shows an embodiment of a process for adaptively controlling an AG parameter to position or align the vehicle with a predetermined swath or path, i.e., swath acquisition. The process in FIG. 4 is similar to the process described in FIG. 2 for swath following, but different adaptive control parameters, membership functions and/or fuzzy logic algorithms can be used as required for swath acquisition. In one embodiment, swath acquisition can be completed once the cross track error is minimized. The minimum cross track error value can depend upon the vehicle type and/or the predetermined swath that is selected. Once the predetermined swath has been "acquired" the automatic guidance control system can switch over to the swath following process described with respect to FIG. 2.

The process begins by engaging the automatic guidance control system, i.e., the operator initiates auto-guidance for the vehicle (step 20). Once the automatic guidance control system is engaged, the automatic guidance control system can retrieve information on the vehicle type and the swath type either from the memory device 218 and/or from the operator input device or user interface 214. In an exemplary embodiment, the information on the swath type can include information on the master swath and/or the predetermined swath for the vehicle.

The automatic guidance control system can then compare the vehicle's actual heading to the swath heading of the predetermined swath, i.e., the difference between the vehicle heading and the swath heading (step 52) and can determine the rate of change of the vehicle's heading relative to the predetermined swath (step 54). In addition, the vehicle travel speed can be measured or determined for use by the automatic guidance control system. Next, the cross track error for the vehicle, i.e., the distance between the actual position of the vehicle and the desired position of the vehicle on the predetermined swath is measured and determined (step 26) and the corresponding rate of change of the cross track error is measured or determined (step 28). The measured or determined cross track error can be saved in the memory device 218 for use in determining the rate of change of the cross track error. In addition, the hydraulic oil temperature for the steering actuator 206 can be measured or determined and/or the engine speed for the vehicle can be measured or determined. If not previously provided in the information on vehicle type and swath type, the minimum turn radius for the vehicle and the swath rate of curvature can be retrieved.

The automatic guidance control system can calculate control signals based on corresponding AG parameters (step 30) determined from one or more of the vehicle travel speed, the cross track error, the rate of change of the cross track error, the vehicle heading difference, the rate of change of the vehicle heading difference, the hydraulic oil temperature, the engine speed, the minimum turn radius for the vehicle or the swath rate of curvature. In one embodiment, the control signals can be pulse width modulation (PWM) control signals to control the current provided to the steering valves 204 to adjust position of the valves 204 and thereby adjust the amount of hydraulic fluid provided to steering actuator 206.

The adaptive AG parameter control system 300 takes the calculated or generated AG control signals and determines response limits or adjustments for the generated control signals and/or corresponding AG parameters in view of the vehicle's operating parameters (step 32). In one embodiment, the calculation of the response limits or adjustments starts by using fuzzy logic membership functions to which the corresponding measured or determined parameters, e.g., cross track error, cross track error rate of change and/or hydraulic oil temperature, are applied. The corresponding determined membership values or degrees of membership are then used by a fuzzy logic algorithm or fuzzy logic rules to determine the corresponding response limits.

The determined response limits are then used to adjust the control signals determined by the automatic guidance control system (step 34) and the adjusted control signals are then applied to the corresponding AG components to control the steering of the vehicle (step 36). The process then returns to determine the vehicle speed and determine where the vehicle is headed on the predetermined swath. The process can be continually repeated for as long as the vehicle is acquiring the predetermined path or until the operator disengages the automatic guidance control system.

In one exemplary embodiment, the adaptive AG parameter control system 300 can use other logic structures or control algorithms instead of a fuzzy logic algorithm to make adjustments to the AG control parameters. Further, any membership functions, categories, logic rules and combinational methods used by the fuzzy logic algorithm of the adaptive AG parameter control system 300 are provided here by way of example only and that alternative membership functions, categories, logic rules and combinational methods may be selected or adapted for use.

In another exemplary embodiment, an electrically controlled steering actuator or other non-hydraulic based steering actuator can be used to move the steerable wheels instead of the hydraulic system described with respect to FIG. 1.

In an exemplary embodiment, the adaptive AG parameter control system 300 can be used by either or both of a harvester and corresponding transport vehicle using automatic guidance control systems for "unload on the go" operations.

In still another exemplary embodiment, the automatic guidance system and the adaptive AG parameter control system can be used or implemented with both agricultural vehicles, such as tractors, harvesters and combines, and construction vehicles, such as dozers, graders and excavators.

The present application contemplates methods, systems and program products on any machine-readable media for accomplishing its operations. The embodiments of the present application may be implemented using existing computer processors, or by a special purpose computer processor for an appropriate system, or by a hardwired system.

Embodiments within the scope of the present application include program products including machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques, with rule based logic or with other logic to accomplish the various connection steps, processing steps, comparison steps and decision steps.

In the further consideration of the drawings of this application and the discussion of such drawings and the elements shown therein, it should also be understood and appreciated that, for purposes of clarity, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already by widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A method for automatically guiding a vehicle, the method comprising:
    engaging an automatic guidance control system to steer a vehicle along a predetermined swath;
    determining a swath path configuration of the predetermined swath to be subsequently travelled by the vehicle;
    determining a cross track error for the vehicle relative to the predetermined swath;
    determining a rate of change of the cross track error;
    calculating a control parameter with the automatic guidance control system in response to the determined swath path configuration, the determined cross track error and the determined rate of change of the cross track error;
    generating a control signal to steer the vehicle based on the calculated control parameter;
    determining an operating condition for the vehicle;
    calculating a response limit for the calculated control parameter in response to the determined operating condition;
    adjusting the generated control signal by the calculated response limit;
    applying the adjusted control signal to the vehicle to steer the vehicle along the predetermined swath;
    wherein calculating a response limit comprises:
        (a) identifying a membership function for at least one determined operating condition;

(b) calculating a degree of membership for the determined operating condition using the identified membership function; and
(c) applying a fuzzy logic algorithm to determine the response limit based on the calculated degree of membership.

2. The method of claim 1 wherein generating a control signal comprises generating a pulse width modulation control signal.

3. The method of claim 1 wherein the swath path configuration is one of a straight path, a curved path or a sharply curved path.

4. The method of claim 1 further comprising:
determining a vehicle travel speed;
determining a hydraulic oil temperature and engine speed;
determining a minimum turning radius associated with the vehicle; and
wherein calculating a control parameter comprises calculating a control parameter with the automatic guidance control system in response to the determined swath path configuration, the determined cross track error, the determined rate of change of the cross track error, the vehicle travel speed, the hydraulic oil temperature, the engine speed or the minimum turning radius associated with the vehicle.

5. The method of claim 1 wherein calculating a response limit comprises selecting a value of the response limit from a look up table based on the determined operating condition.

6. The method of claim 1 wherein the control parameter is one of steered wheel turn rate, proportional valve current gain, line acquisition rate, or auto guidance control valve current limit.

7. The method of claim 1 wherein the determined operating condition for the vehicle is one of vehicle travel speed, the cross track error, the rate of change of the cross track error, hydraulic oil temperature, engine speed, minimum turn radius for the vehicle or the swath path configuration.

8. The method of claim 7 wherein the determined operating condition for the vehicle further includes one of vehicle dynamics, side hill operation of the vehicle, implement side draft associated with the vehicle or change in vehicle mass.

* * * * *